(12) United States Patent
Shimura et al.

(10) Patent No.: US 11,079,275 B2
(45) Date of Patent: Aug. 3, 2021

(54) FAR-INFRARED SPECTROSCOPY DEVICE

(71) Applicant: Hitachi High-Tech Corporation, Tokyo (JP)

(72) Inventors: Kei Shimura, Tokyo (JP); Mizuki Oku, Tokyo (JP); Kenji Aiko, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 102 days.

(21) Appl. No.: 15/743,151

(22) PCT Filed: Jul. 22, 2015

(86) PCT No.: PCT/JP2015/070794
§ 371 (c)(1),
(2) Date: Jan. 9, 2018

(87) PCT Pub. No.: WO2017/013759
PCT Pub. Date: Jan. 26, 2017

(65) Prior Publication Data
US 2018/0209848 A1    Jul. 26, 2018

(51) Int. Cl.
*G01J 3/10* (2006.01)
*G01N 21/3581* (2014.01)
(Continued)

(52) U.S. Cl.
CPC ............. *G01J 3/108* (2013.01); *G01J 3/0202* (2013.01); *G01J 3/0205* (2013.01);
(Continued)

(58) Field of Classification Search
CPC ........... G01J 3/0291; G01J 3/108; G02F 1/37; G02F 1/39; G02B 13/08
See application file for complete search history.

(56) References Cited

U.S. PATENT DOCUMENTS 3,191,488 A * 6/1965 Eisner ..................... G01J 3/14
356/300
9,835,494 B2 * 12/2017 Shiramizu .......... G01B 9/02041
(Continued)

FOREIGN PATENT DOCUMENTS

JP    2-46787 A    2/1990
JP    11-125768 A    5/1999
(Continued)

OTHER PUBLICATIONS

English translation of JP 2012-203013, attained from ESPACENET. (Year: 2012).*
(Continued)

*Primary Examiner* — Michael A Lyons
(74) *Attorney, Agent, or Firm* — Crowell & Moring LLP

(57) ABSTRACT

This far-infrared spectroscopy device is provided with: a variable wavelength far-infrared light source that generates first far-infrared light; an illuminating optical system that irradiates a sample with the first far-infrared light; a detecting nonlinear optical crystal that converts second far-infrared light into near-infrared light using pump light, said second far-infrared light having been transmitted from the sample; and a far-infrared image-forming optical system that forms an image of the sample in the detecting nonlinear optical crystal. The irradiation position of the first far-infrared light on the sample does not depend on the wavelength of the first far-infrared light.

10 Claims, 12 Drawing Sheets

(51) Int. Cl.
    *G02F 1/39*     (2006.01)
    *G01J 3/02*     (2006.01)
    *G01J 3/32*     (2006.01)
    *G01J 3/42*     (2006.01)
    *G02F 1/37*     (2006.01)

(52) U.S. Cl.
    CPC .......... *G01J 3/0208* (2013.01); *G01J 3/0224* (2013.01); *G01J 3/0237* (2013.01); *G01J 3/0264* (2013.01); *G01J 3/0289* (2013.01); *G01J 3/0291* (2013.01); *G01J 3/32* (2013.01); *G01J 3/42* (2013.01); *G01N 21/3581* (2013.01); *G02F 1/37* (2013.01); *G02F 1/39* (2013.01); *G01J 2003/425* (2013.01)

(56) References Cited

U.S. PATENT DOCUMENTS

| | | |
|---|---|---|
| 2002/0024718 A1 | 2/2002 | Kawase et al. |
| 2003/0227668 A1 | 12/2003 | Imai et al. |
| 2004/0061055 A1 | 4/2004 | Kawase et al. |
| 2005/0167410 A1 | 8/2005 | Bourne et al. |
| 2006/0153255 A1 | 7/2006 | Wada et al. |
| 2007/0160093 A1 | 7/2007 | Nishizawa et al. |
| 2007/0263682 A1* | 11/2007 | Zhang .................. G01N 21/636 372/25 |
| 2010/0090112 A1 | 4/2010 | Kawada et al. |
| 2011/0037001 A1 | 2/2011 | Maki et al. |
| 2011/0038032 A1 | 2/2011 | Maki et al. |
| 2011/0057109 A1 | 3/2011 | Guo et al. |
| 2013/0088590 A1 | 4/2013 | Shimura et al. |
| 2014/0198973 A1* | 7/2014 | Zhang ...................... G01J 3/42 382/149 |
| 2014/0264032 A1 | 9/2014 | Neshat et al. |
| 2016/0299064 A1* | 10/2016 | Shimura ............... G01J 3/0224 |
| 2017/0067821 A1* | 3/2017 | Giles ......................... G01J 3/42 |
| 2017/0167974 A1 | 6/2017 | Koizumi |
| 2018/0031469 A1 | 2/2018 | Aiko et al. |

FOREIGN PATENT DOCUMENTS

| | | |
|---|---|---|
| JP | 2002-72269 A | 3/2002 |
| JP | 2003-302666 A | 10/2003 |
| JP | 2004-108905 A | 4/2004 |
| JP | 2005-172774 A | 6/2005 |
| JP | 2006-84422 A | 3/2006 |
| JP | 2006-84423 A | 3/2006 |
| JP | 2006-102896 A | 4/2006 |
| JP | 2006-171624 A | 6/2006 |
| JP | 2008-96210 A | 4/2008 |
| JP | 2009-217085 A | 9/2009 |
| JP | 2009-265361 A | 11/2009 |
| JP | 2009-265367 A | 11/2009 |
| JP | 2010-96729 A | 4/2010 |
| JP | 2011-75583 A | 4/2011 |
| JP | 2012-26943 A | 2/2012 |
| JP | 2012-203013 A | 10/2012 |
| JP | 2015-127699 A | 7/2015 |
| JP | 2015-152405 A | 8/2015 |
| WO | WO 2005/073795 A1 | 8/2005 |
| WO | WO 2015/122211 A1 | 8/2015 |

OTHER PUBLICATIONS

English translation of JP 2005-172774, attained from ESPACENET. (Year: 2005).*

English translation of JPH11-125768, attained from J-PlatPat. (Year: 1999).*

Japanese-language Office Action issued in counterpart Japanese Application No. 2017-529225 dated Sep. 25, 2018 with English translation (10 pages).

Japanese-language Office Action issued in counterpart Japanese Application No. 2017-529225 dated Feb. 12, 2019 (three (3) pages).

Japanese-language third-party submitted his opinion and/or information in counterpart Japanese Application No. 2019-084299 dated Dec. 10, 2019 (five pages).

International Search Report (PCT/ISA/210) issued in PCT Application No. PCT/JP2015/070794 dated Oct. 13, 2015 with English-language translation (two (2) pages).

Japanese-language Written Opinion (PCT/ISA/237) issued in PCT/JP2015/070794 dated Oct. 13, 2015 (five (5) pages).

Japanese-language Office Action issued in Japanese Application No. 2019-084299 dated Mar. 31, 2020 (five (5) pages).

Japanese-language Office Action issued in Japanese Application No. 2019-084300 dated Feb. 4, 2020 (four (4) pages).

United States Office Action issued in U.S. Appl. No. 16/689,802 dated Aug. 20, 2020 (14 pages).

Japanese-language Office Action issued in Japanese Application No. 2019-084299 dated Nov. 17, 2020, with English translation (8 pages).

* cited by examiner

FAR-INFRARED SPECTROSCOPY DEVICE

TECHNICAL FIELD

The present invention relates to a far-infrared spectroscopy device.

BACKGROUND ART

Electromagnetic waves in a far-infrared region ranging from 25 μm to 4 mm in a wavelength are also called terahertz waves and have both radio wave permeability and light straightness. Since the absorption spectrum in this region has peaks inherent in many substances, the electromagnetic waves in the far-infrared region are expected to be effective for identification of substances. However, in the related art, there was no compact and easy-to-use light source that emits light in this region, and a detector was also necessary to cool with liquid helium or the like, which made the light source difficult to handle. Therefore, in the related art, electromagnetic waves in a far-infrared region was used only for limited research applications.

In the 1990s, a light source and detector using a femtosecond laser which are small and do not require cooling were put to practical use. Currently, general-purpose spectroscopic measuring devices based on time-domain spectroscopy are also on the market, and research and development for various fields such as security, bio-sensing, medicine/pharmaceutical, industry, agriculture, and the like are underway. In such industrial applications, quantitative analysis of components is required.

CITATION LIST

Patent Literature

PTL 1: JP-A-2003-302666

SUMMARY OF INVENTION

Technical Problem

Quantitative analysis of components is one key in industrial applications. There is an attempt to use quantitative analysis with time-domain spectroscopy, but this method has problems that it is difficult to measure 1 to 3 THz waves which are effective for detection of hydrogen bonding or molecular network, to measure through a shield such as paper and packaging materials, and to measure powder with strong scattering. On the other hand, the method using a variable frequency coherent light source is easy to obtain high output in the region of 1 to 3 THz, and is effective for analysis through a shield and analysis of powder.

However, with the above method, when the frequency is changed, the direction in which far-infrared light comes out changes, thus there is a problem that an irradiation position to a sample changes, and the accuracy of quantitative analysis is lowered.

Therefore, the present invention provides a far-infrared spectroscopy device capable of reducing the shift of an irradiation position of far-infrared light by frequency change.

Solution to Problem

For example, in order to solve the above problem, the configuration described in the claims is adopted. Although the present application includes a plurality of means for solving the above-mentioned problem, as an example thereof, there is provided a far-infrared spectroscopy device that includes a variable wavelength far-infrared light source that generates first far-infrared light, an illumination optical system that emits the first far-infrared light onto a sample, a nonlinear optical crystal for detection that converts second far-infrared light from the sample into near-infrared light by using pump light, and a far-infrared light imaging optical system that images the sample on the nonlinear optical crystal for detection, in which an irradiation position of the first far-infrared light on the sample does not depend on a wavelength of the first far-infrared light.

Advantageous Effects of Invention

According to the present invention, shift of an irradiation position of far-infrared light due to frequency change may be reduced. Further features relating to the present invention will become apparent from the description of this specification and the accompanying drawings. In addition, the problems, configurations, and effects other than those described above will be clarified by the description of the following examples.

DESCRIPTION OF EMBODIMENTS

Hereinafter, examples of the present invention will be described with reference to the accompanying drawings. The accompanying drawings illustrate specific examples consistent with the principles of the invention, but these examples are for an understanding of the present invention and are not used to limit interpretation of the present invention in any way.

The following example relates to a far-infrared spectroscopy device that analyzes a sample by using light in a far-infrared region in an analysis of the content of a chemical substance component in a sample or an inspection process such as inspection of a heterogeneous component or a contaminant. Here, the light in the far-infrared region is, for example, light ranging from 25 μm to 4 mm in a wavelength. Numerical ranges of various wavelengths exist as the definition of "far-infrared region", but the light in the far-infrared region described below should be interpreted as the widest range within the range defined in every field. In addition, the term "terahertz wave" is assumed to be included in the far-infrared region described above.

First Example

Figure 1A:
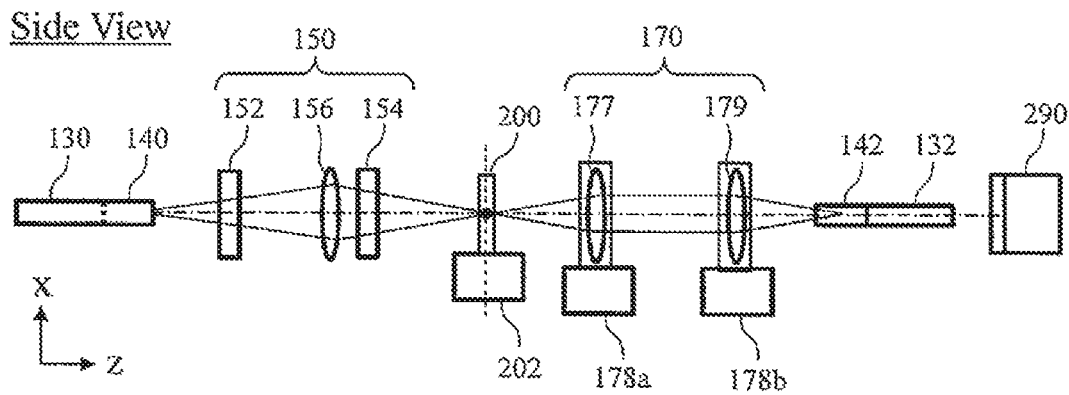
FIG. 1A is a side view of a configuration example of a spectroscopy device using light in a far-infrared region in a first example of the present invention.
Figure 1B:
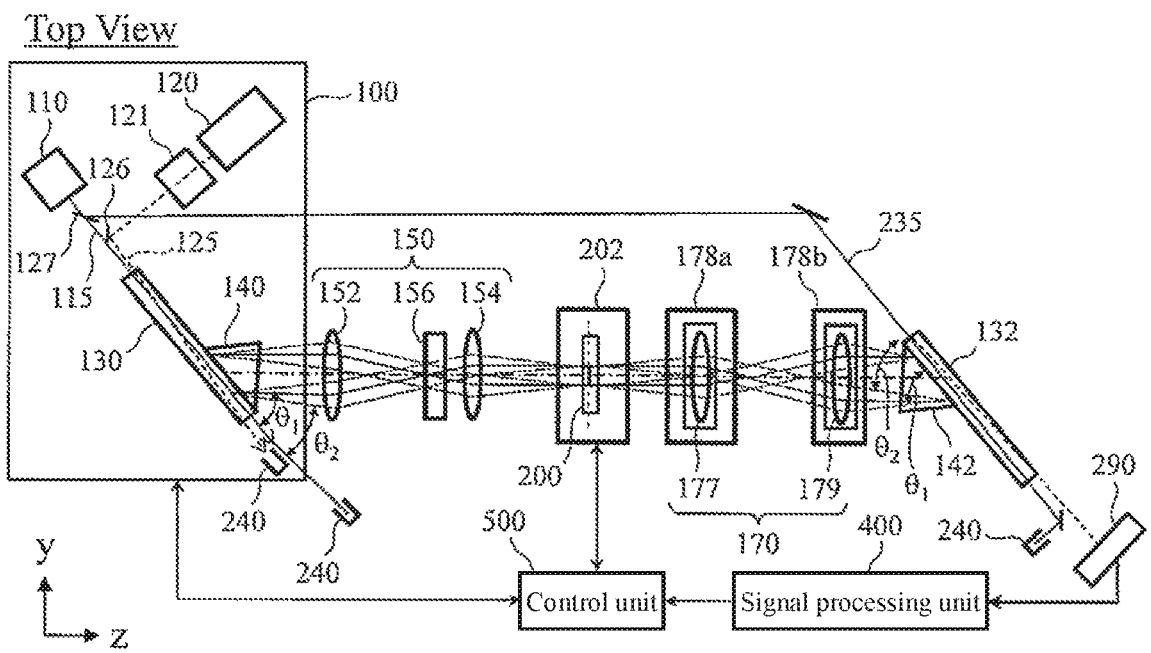
FIG. 1B is a top view of a configuration example of a spectroscopy device using light in the far-infrared region in the first example of the present invention.

FIGS. 1A and 1B show examples of the overall configuration of a far-infrared spectroscopy device according to a first example. As an example, the far-infrared spectroscopy device is a device that measures the absorption spectrum of a sample 200 by using light transmitted through sample 200.

The far-infrared spectroscopy device includes a variable wavelength far-infrared light source 100 that generates far-infrared light, an illumination optical system 150 that emits far-infrared light to the sample 200, a sample stage 202 that mounts the sample 200, a far-infrared light imaging optical system 170 that images the far-infrared light from the sample 200 onto a nonlinear optical crystal for detection 132, the nonlinear optical crystal for detection 132 that converts the far-infrared light from sample 200 into near-infrared light by using pump light, a photo-detector (sensor) 290, a signal processing unit 400, and a control unit 500.

The variable wavelength far-infrared light source 100 includes a light source 110 for the pump light 115, a variable wavelength light source 120 for a seed light 125, an incident angle adjusting optical system 121, and a nonlinear optical crystal (a nonlinear optical crystal for generating far-infrared light) 130. As the variable wavelength far-infrared light source 100, a configuration that two beams of laser light (pump light 115 and seed light 125) of different wavelengths are incident on the nonlinear optical crystal 130 to generate far-infrared light by difference frequency generation or parametric generation is used.

For example, $MgO:LiNbO_3$ may be used as the nonlinear optical crystal 130 and a short-pulse Q switch YAG laser may be used as the light source 110 of the pump light 115. In this configuration, the light from the variable wavelength light source 120 is incident as the seed light 125 to the nonlinear optical crystal 130 at a slight angle with respect to the pump light 115 via the incident angle adjusting optical system 121 and the mirror 126. As a result, the far-infrared light may be obtained by parametric generation.

A Si prism 140 may be attached to the nonlinear optical crystal 130. According to this configuration, the generated far-infrared light may be taken out efficiently. If the wavelength of the seed light 125 is changed in the range of 1066 nm to 1076 nm and the incident angle to the nonlinear optical crystal 130 is adjusted by the incident angle adjusting optical system 121, the frequency of the generated far-infrared light may be changed within the range of about 0.5 THz to 3 THz.

Figure 1C:
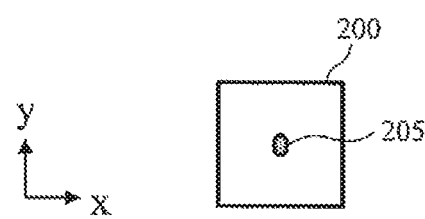
FIG. 1C is a plan view showing an irradiation region of a sample in the first example of the present invention.

The far-infrared light thus obtained is emitted to the irradiation region 205 on the sample 200 by using the illumination optical system 150. FIG. 1C is a plan view showing an irradiation region of the sample 200.

The illumination optical system 150 is an anamorphic imaging optical system consisting of at least three cylindrical lenses 152, 154, and 156. Here, "anamorphic" means that optical characteristics are different from each other in two orthogonal planes including an optical axis. Specifically, in the "imaging optical system", the term "anamorphic" means that magnifications are different from each other in two orthogonal planes including the optical axis.

The illumination optical system 150 will be described more specifically. In the plane of FIG. 1B, the cylindrical lenses 152 and 154 have optical power. The emission region of the far-infrared light is arranged on the front focal plane of the cylindrical lens 152. Here, the light-emitting region is a linear light-emitting region (for example, a linear region passing through B0 and A0 in FIG. 2) along the pump light 115. In addition, the cylindrical lens 154 is arranged so that the rear focal plane of the cylindrical lens 152 and the front focal plane of the cylindrical lens 154 coincide. Further, the sample 200 is arranged on the rear focal plane of the cylindrical lens 154.

An aperture diaphragm may be provided on the rear focal plane of the cylindrical lens 152 (that is, also the front focal plane of the cylindrical lens 154). According to this configuration, an optical system that is exactly double-side telecentric within the plane of FIG. 1B is obtained, but an aperture diaphragm is not indispensable here. By using the aperture diaphragm, the range of use of far-infrared light may be limited.

The illumination optical system 150 is an afocal optical system and may function as a substantially double-side telecentric optical system from the spreading characteristics of the far-infrared beam emitted from the nonlinear optical crystal 130.

In addition, in the plane of FIG. 1A, the cylindrical lens 156 includes optical power. The cylindrical lens 156 is arranged so that the light-emitting region of far-infrared light is imaged on the sample 200.

The illumination optical system 150 is an imaging optical system that collimates far-infrared light in a first cross section including the optical axis of the far-infrared light from the variable wavelength far-infrared light source 100 and condenses the far-infrared light again on the sample 200 surface and is a condensing optical system that condenses the far-infrared light from the variable wavelength far-infrared light source 100 onto the sample 200 surface in a second cross section orthogonal to the first cross section. In particular, the far-infrared light emitted from the variable wavelength far-infrared light source 100 is a linear light source (FIG. 2) along the beam of the pump light 115. The far-infrared light emitted from the variable wavelength far-infrared light source 100 spreads in the plane of FIG. 1A, but becomes parallel light flux in the plane of FIG. 1B. In the plane of FIG. 1A, the far-infrared light is converged to the irradiation region on the sample 200 by the cylindrical lens 156. On the other hand, in the plane of FIG. 1B, the far-infrared light is temporarily condensed by the cylindrical lens 152, converted into parallel light flux again by the cylindrical lens 154, and emitted onto the sample 200. In this manner, the illumination optical system 150 may image a linear light-emitting region formed by the variable wavelength far-infrared light source 100 on the sample 200 by reducing the longitudinal direction of the linear region.

The illumination optical system 150 is afocal in a first cross section including the optical axis of the far-infrared light from the variable wavelength far-infrared light source 100. By setting the illumination optical system 150 as an afocal system (that is, the cylindrical lens 154 is arranged so that the rear focal plane of the cylindrical lens 152 coincides with the front focal plane of the cylindrical lens 154), almost parallel far-infrared light in the plane of FIG. 1B to be generated in the nonlinear optical crystal 130 may be emitted to the sample 200 as parallel light flux as it is. In addition, the far-infrared light transmitted through the sample 200 may be efficiently captured into the far-infrared light imaging optical system 170.

In this manner, by setting the illumination optical system 150 as the imaging optical system, it becomes possible to secure the stability of the illumination when the wavelength of the far-infrared light emitted from the variable wavelength far-infrared light source 100 is changed. That is, by setting the illumination optical system 150 as the imaging optical system, the irradiation position of the far-infrared light on the sample 200 does not depend on the wavelength of the far-infrared light from the variable wavelength far-infrared light source 100.

In order to change the wavelength of the far-infrared light, the incident angle to the nonlinear optical crystal 130 is adjusted while changing the wavelength of the seed light 125. At that time, the emission direction of far-infrared light to be generated changes in the in-plane direction of FIG. 1B (for example, θ1 to θ2 in FIG. 1B). Also in this case, by setting the illumination optical system 150 as the imaging optical system and setting the light-emitting region of far-infrared light and the sample 200 surface to a conjugate relationship (imaging relation), it is possible to prevent a spot of the far-infrared light from moving even on the sample 200 surface. Even if the wavelength of far-infrared light is changed, since the irradiation position of the sample 200 is not shifted, there is no change in the amount of illumination light, and stable illumination may be secured. On the other hand, when the illumination optical system 150 is not used as the imaging optical system, there is a possibility that the illumination position of the illumination light may be totally different, making stable capturing difficult. However, this is not limited to a case of capturing with a fixed wavelength and a case where the change range of the wavelength is small and the change of the direction of far-infrared light is sufficiently small.

In addition, by setting the illumination optical system 150 as an anamorphic optical system, the linear light-emitting region of the variable wavelength far-infrared light source 100 may be illuminated with the sample 200 as a spot by reducing the longitudinal direction of the linear region. According to this configuration, two-dimensional data may be obtained by scanning the spot on the sample 200 as described below.

The sample 200 to be captured is mounted on the stage 202. The stage 202 includes a mechanism movable in at least one direction. For example, the stage 202 may move in an x direction in FIG. 1. According to this configuration, by moving the sample 200 in the x direction, the irradiation region 205 may be scanned on the surface of the sample 200, and the data of the linear region of the sample 200 may be acquired. Further, the stage 202 may be an xy stage movable in the x direction and a y direction. Two-dimensional data (image) of a wider region of the sample 200 may also be obtained by combining scanning in the x direction and scanning in the y direction.

The wavelength of the far-infrared light transmitted through the sample 200 is converted to near-infrared light in the vicinity of a wavelength of 1066 nm to 1076 nm by the nonlinear optical crystal for detection 132. The converted near-infrared light is photoelectrically converted by the photo-detector 290 that is sensitive to near-infrared light and detected as a detection signal. The photo-detector (sensor) 290 for near-infrared light may be a light-receiving element (1D array detector) in which a plurality of light-receiving elements are arranged in a one-dimensional array, or may be a light-receiving element (2D array detector) in which a plurality of light-receiving elements are arranged in a two-dimensional array. The 1D array detector and the 2D array detector for near-infrared light are comparatively easy to obtain, the response speed thereof is fast, and may be used at a room temperature. Therefore, these detectors are suitable for industrial applications.

As in the above example, in a case of converting the wavelength of far-infrared light to near-infrared light by using the nonlinear optical crystal for detection 132, a part of the pump light 115 is branched and is incident on the nonlinear optical crystal for detection 132 after adjustment. For example, the pump light 115 is split into transmitted light and reflected light by a polarization beam splitter (hereinafter, referred to as PBS) 127. The transmitted light transmitted through the PBS 127 is incident on the nonlinear optical crystal 130. The reflected light (pump light for wavelength conversion) 235 reflected by the PBS 127 is incident to the nonlinear optical crystal for detection 132.

The pump light 235 for wavelength conversion is incident on the nonlinear optical crystal for detection 132 at the same timing as the timing of the pulse of far-infrared light transmitted through the sample 200 being incident. For this reason, illustration is omitted on the optical path of the pump light 235 for wavelength conversion, but a delay optical system (for example, an optical path length correction stage and the like) for adjusting the timing of the optical pulses, and a half-wavelength plate for adjusting a polarization direction are provided as necessary. According to this configuration, it is possible to use a clean beam having a profile in wavelength conversion upon far-infrared light detection. As a result, it is possible to increase the efficiency of wavelength conversion and increase the detection sensitivity.

The far-infrared light transmitted through the sample 200 is guided to the nonlinear optical crystal for detection 132 by using the far-infrared light imaging optical system 170. For example, the far-infrared light imaging optical system 170 is an afocal imaging optical system including at least two lenses 177 and 179. The lens 177 is arranged on a stage 178a. In addition, the lens 179 is arranged on the stage 178b. The stages 178a and 178b are movable in at least one direction (here, the y direction). A mechanism for moving at least the lens on the sample 200 side out of the two lenses 177 and 179 in at least one direction may be provided. The sample 200 surface is imaged within the nonlinear optical crystal for detection 132 through an Si prism 142. For the nonlinear optical crystal for detection 132, LiNbO3 or MgO:LiNbO3 may be used. Each light beam passing through the nonlinear optical crystal for detection 132 and the nonlinear optical crystal 130 is received and processed by a termination processing unit 240 (see FIG. 1B).

Figure 6:
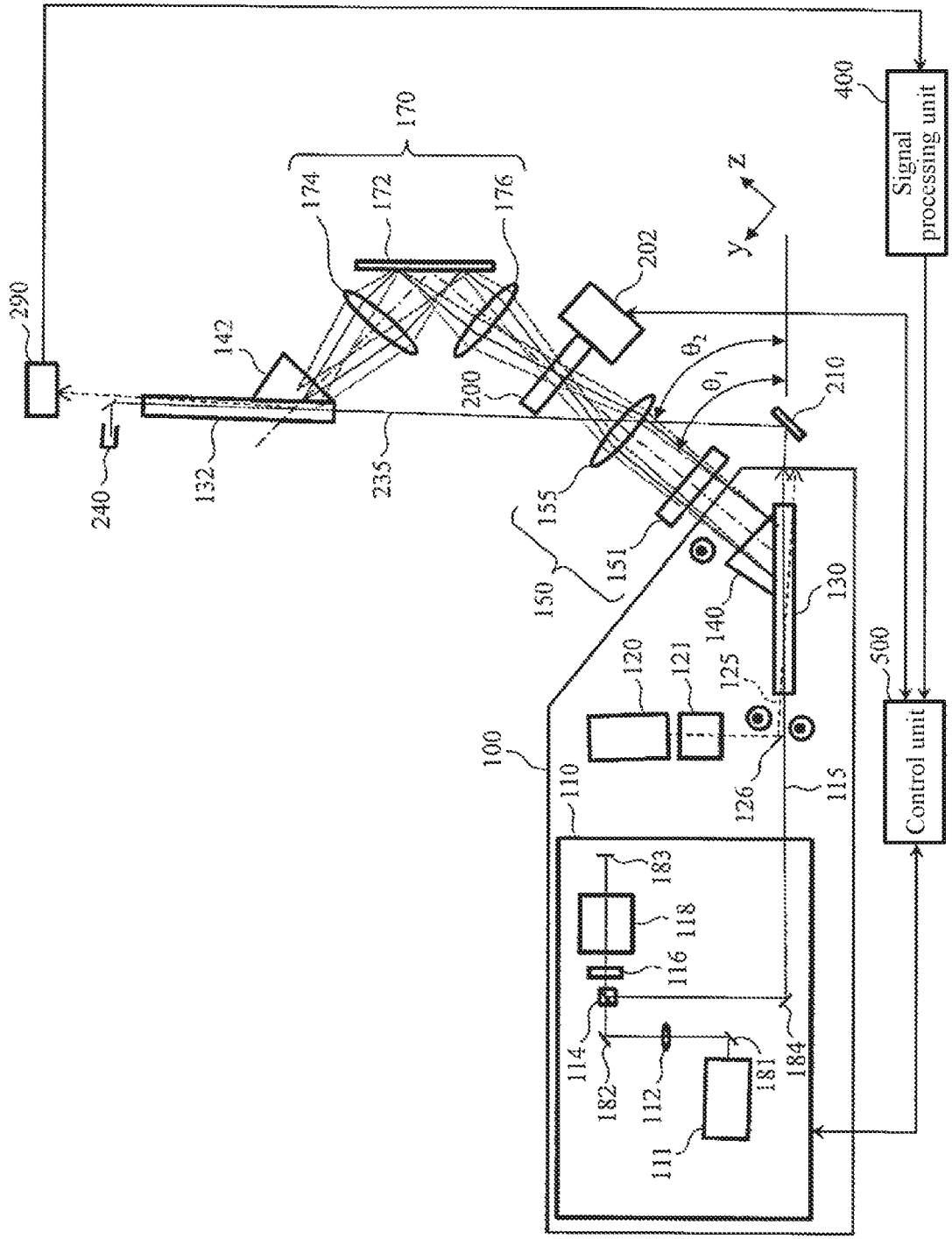
FIG. 6 is a view showing a configuration example of the spectroscopy device using light in a far-infrared region in a second example of the present invention.

In a case where the output of the light source 110 for the pump light 115 has no margin, the pump light passing through the nonlinear optical crystal 130 may be guided to the nonlinear optical crystal for detection 132 and reused (see, for example, FIG. 6). Since the quality of the beam of the pump light used for wavelength conversion deteriorates, the detection efficiency decreases, but it is possible to efficiently use pump light for generation of far-infrared light and wavelength conversion to near infrared.

The signal processing unit 400 captures the signal photoelectrically converted by the photo-detector 290. The signal processing unit 400 generates a signal proportional to the light transmitted through the sample 200 and the distribution image thereof based on the position information of the stage 202 at the time of signal acquisition. The signal processing unit 400 may calculate an absorption spectrum and obtain a two-dimensional distribution (absorption spectrum image) of the absorption spectrum by comparing the acquired image data with the spectral image data (reference data) when there is no sample stored in the storage region of the signal processing unit 400.

The control unit 500 controls the entire device. For example, the control unit 500 controls the variable wavelength far-infrared light source 100, the stages 202, 178a, 178b, and the signal processing unit 400. In addition, the control unit 500 functions as a user interface. For example, the control unit 500 may include a display unit that displays the signal and data (spectral information) acquired by the signal processing unit 400. In a case of acquiring data of the sample 200 by fixing the wavelength, the control unit 500 controls the variable wavelength far-infrared light source 100 to generate a specified far-infrared light and controls the synchronization of the movement of the stage 202 and the data acquisition by the photo-detector 290. In addition, in a case of acquiring data of the sample 200 by changing the wavelength, the control unit 500 sets the wavelength of the variable wavelength far-infrared light source 100 and controls the synchronization between the movement of the stage 202 and the data acquisition by the photo-detector 290.

In the present example, the short-pulse Q switch YAG laser is used as the light source 110 for the pump light of the variable wavelength far-infrared light source 100, but the present invention is not limited thereto. As long as the line width of a fundamental spectrum is narrow, a mode-locked laser may be used as light source 110 for pump light. Since the mode-locked laser has high repetition rate, faster measurement becomes possible.

Figure 4A:
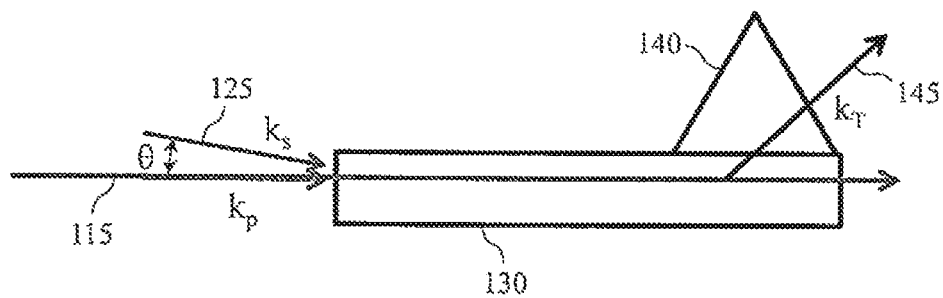
FIG. 4A is a view showing how far-infrared light is generated in the first example of the present invention.

Here, how far-infrared light is generated will be described with reference to FIG. 4A. FIG. 4A shows an example in which MgO:LiNbO$_3$ is used as the nonlinear optical crystal 130 and far-infrared light is generated by parametric generation.

The pump light 115 is incident on the nonlinear optical crystal 130, and on the contrary, the seed light 125 is incident on the nonlinear optical crystal 130 at an angle θ. By setting the wavelength of the seed light and the angle θ with respect to the pump light so as to satisfy the following conditions, far-infrared light 145 may be generated with high efficiency. The frequency ($\omega_T$) of the far-infrared light 145 to be generated in the nonlinear optical crystal 130 is obtained by the following expression from the law of conservation of energy by using the respective frequencies ($\omega_p$ and $\omega_s$) of the pump light 115 and the seed light 125 (however, ω is an angular frequency).

$$\omega_T = \omega_p - \omega_s \qquad \text{[Expression 1]}$$

Figure 4B:
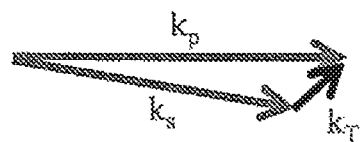
FIG. 4B is a view showing respective wave vectors of far-infrared light, pump light, and seed light.

On the other hand, the generation efficiency of the far-infrared light 145 increases when the law of conservation of momentum holds. That is, high efficiency is obtained when the following relational expression and the condition (phase matching condition) in FIG. 4B are established between the emission direction of the far-infrared light 145 and the direction of the pump light 115 and the seed light 125. Here, the wave vectors of the far-infrared light 145, pump light 115, and seed light 125 are $k_T$, $k_p$, and $k_s$.

$$k_p = k_s + k_T \qquad \text{[Expression 2]}$$

Accordingly, far-infrared light (terahertz light) may be generated with high efficiency by setting the wavelength and the incident direction (θ) of the seed light 125 so as to satisfy these conditions.

Figure 5:
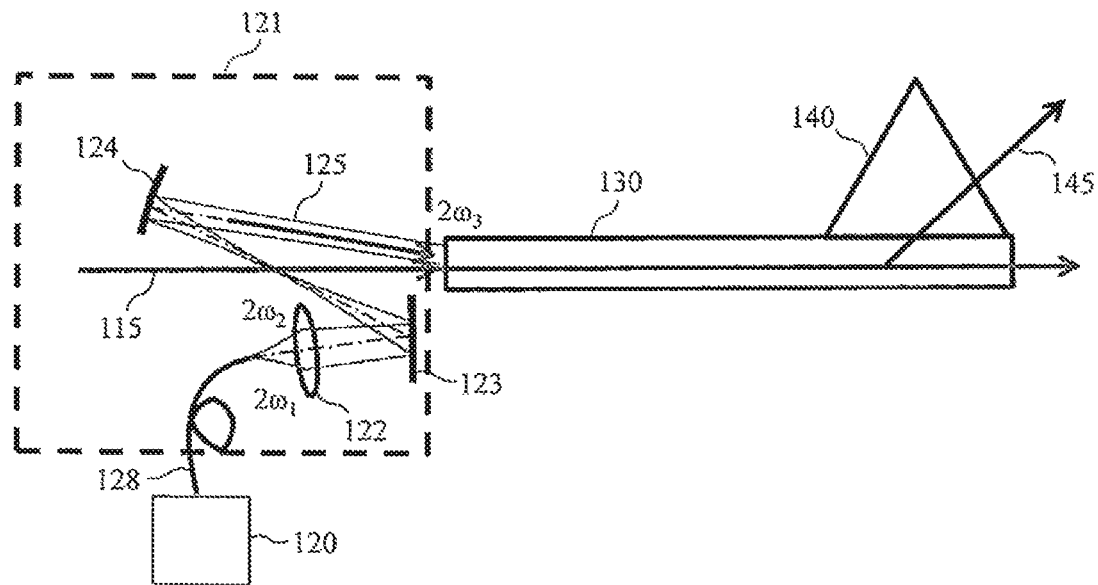
FIG. 5 is a view showing a configuration example of an incident angle adjusting optical system in the first example of the present invention.

In the present example, the incident angle adjusting optical system 121 adjusts the incident angle of the seed light 125 to the nonlinear optical crystal 130. FIG. 5 shows a configuration example of the incident angle adjusting optical system 121.

The incident angle adjusting optical system 121 consists of a lens 122, an optical deflector 123, and an imaging optical element 124. Light from variable wavelength light source 120 is guided through a fiber 128. Light from the fiber 128 forms a beam waist near the front focal plane of the imaging optical element 124 via the lens 122 and the optical deflector 123. According to this configuration, the beam that passed through the imaging optical element 124 becomes a beam with a long Rayleigh length (that is, close to a collimated state) and is incident on the nonlinear optical crystal 130.

On the other hand, the imaging optical element 124 is configured to image the surface of the optical deflector 123 on the incident plane of the nonlinear optical crystal 130. As a result, it is possible to realize a condition that, when the beam is shaken by the optical deflector 123, the beam position does not change on the incident surface of the nonlinear optical crystal 130 but only the incident angle changes.

As the optical deflector 123, a reflective deflector such as a galvanometer mirror or a mirror using a MEMS technique may be used, or a transmissive optical deflector may be used. That is, as long as the angle may be controlled, any kind of optical deflector 123 may be used.

In addition, in this example, a concave mirror is used as the imaging optical element 124. However, since it is sufficient that the incident surface of the optical deflector 123 and the incident surface of the nonlinear optical crystal 130 may be in an imaging relationship, a lens may be used as the imaging optical element 124. If a reflective optical deflector such as a galvano mirror is used as the optical deflector 123 and a concave mirror is used as the imaging optical element 124, it is possible to fold and convolve the optical path, thus it is possible to form the incident angle adjusting optical system 121 compactly.

In a case where the incident angle adjusting optical system 121 is linearly mounted, a transmissive optical deflector may be used as the optical deflector 123 and a lens may be used as the imaging optical element 124. Further, depending on the mounting restrictions, one of the optical deflector 123 and the imaging optical element 124 may consist of a reflective optical element, and the other may consist of a transmissive optical element.

In this example, a single imaging optical element, such as a single lens or a single concave mirror, is available as the imaging optical element 124. Therefore, it is possible to form the optical system compactly.

In addition, according to the incident angle adjusting optical system 121 of this example, when the wavelength of variable wavelength light source 120 is changed, by setting the incident angle $\theta$ to the nonlinear optical crystal 130 of the seed light 125 by controlling with the optical deflector 123, it is possible to set the incident angle $\theta$ to the nonlinear optical crystal 130 with high accuracy. Therefore, stability of the far-infrared light output and stability of the absorption spectrum measurement may be improved when the wavelength of the seed light 125 is changed. As a result, highly accurate quantitative measurement may be performed.

Next, how the far-infrared light propagates will be described with reference to FIG. 2. The far-infrared light emitted from the variable wavelength far-infrared light source 100 is a linear light source along the beam of the pump light 115. Since this linear light source is tilted with respect to the optical axis (a z axis in FIG. 2), attention is required to guide the beam to the nonlinear optical crystal for detection 132.

Figure 2:
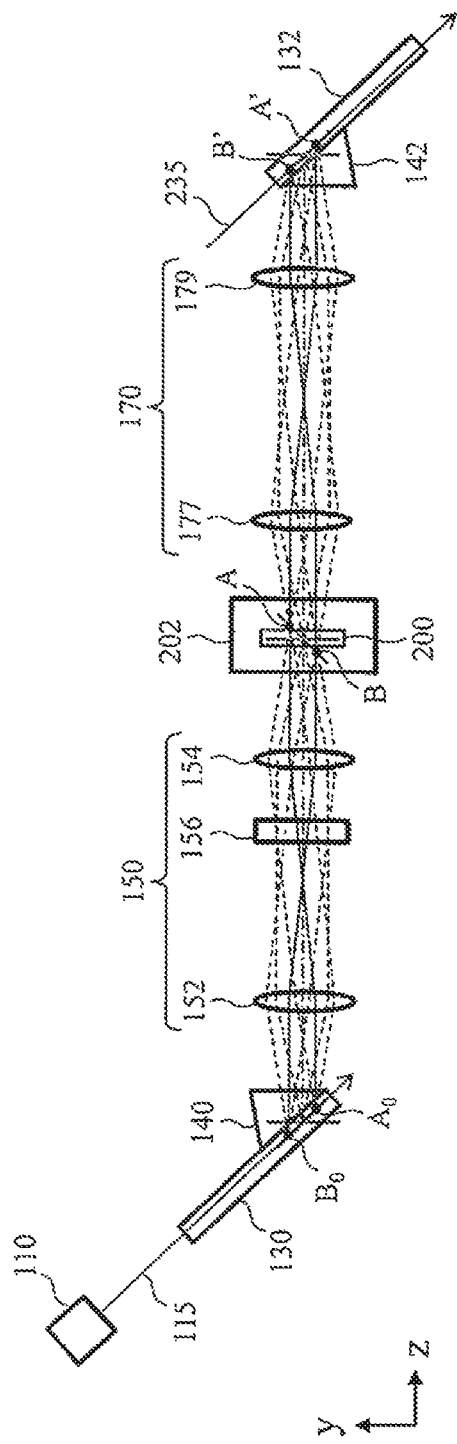
FIG. 2 is a view showing how far-infrared light propagates in the first example of the present invention.

FIG. 2 shows an optical path until the far-infrared light generated in the nonlinear optical crystal 130 is incident on the nonlinear optical crystal for detection 132 via the illumination optical system 150, the sample 200, and the far-infrared light imaging optical system 170.

Here, two points ($A_0$ and $B_0$) on a linear light source of far-infrared light along the beam of the pump light 115 will be described as an example. The points $A_0$ and $B_0$ are imaged in the vicinity of the sample 200 by the illumination optical system 150, but since the point $B_0$ is away from the illumination optical system 150 than the point $A_0$, the point B which is the image is formed at a position closer to the illumination optical system 150 in the vicinity of the sample 200. These points A and B are guided again to the nonlinear optical crystal for detection 132 in the far-infrared light imaging optical system 170. Here, since the point B is away from the far-infrared light imaging optical system 170 than the point A, the point B' which is the image is formed at a position closer to the far-infrared light imaging optical system 170 than the point A' within the nonlinear optical crystal for detection 132. Therefore, the nonlinear optical crystal 130 and the nonlinear optical crystal for detection 132 are arranged so that the incident direction of the pump light 115 in the nonlinear optical crystal 130 and the incident direction of the pump light 235 in the nonlinear optical crystal for detection 132 are substantially parallel. Since the incident direction of the pump light 115 in the nonlinear optical crystal 130 and the incident direction of the pump light 235 in the nonlinear optical crystal for detection 132 are substantially parallel, both the points A' and B' may be superimposed on the beam of the pump light 235 for wavelength conversion, and thus far-infrared light may be efficiently converted to near-infrared light.

Next, a method of adjusting the incident angle when far-infrared light transmitted through the sample 200 is incident on the nonlinear optical crystal for detection 132 will be described with reference to FIG. 3.

In order to convert far-infrared light transmitted through the sample 200 to near-infrared light in the nonlinear optical crystal for detection 132 with high efficiency, optimization of the incident angle of the far-infrared light transmitted through sample 200 to the nonlinear optical crystal for detection 132 is necessary. In the present example, adjustment of the incident angle is performed by adjusting the positions of the lenses 177 and 179 constituting the far-infrared light imaging optical system 170.

Figure 3A:
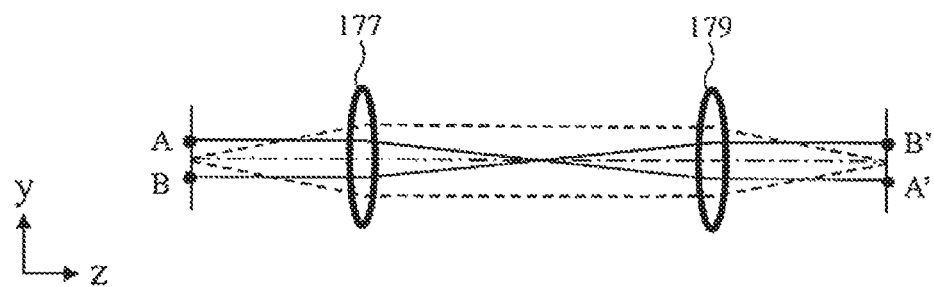
FIG. 3A is a view for explaining a method of adjusting an incident angle when far-infrared light transmitted through the sample is incident on a nonlinear optical crystal for detection in the first example of the present invention.
Figure 3B:
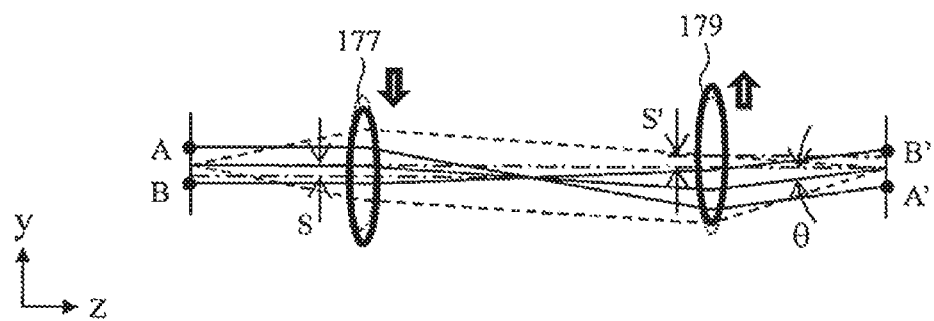
FIG. 3B is a view for explaining a method of adjusting the incident angle when far-infrared light transmitted through the sample is incident on the nonlinear optical crystal for detection in the first example of the present invention.

FIGS. 3A and 3B show the far-infrared light imaging optical system 170. The points A and B are two points on the sample 200, and these points A and B are imaged at points A' and B' within the nonlinear optical crystal for detection 132 by the far-infrared light imaging optical system 170.

FIG. 3A shows a reference state, and FIG. 3B shows a state in which the incident angle to the nonlinear optical crystal for detection 132 of the far-infrared light transmitted through the sample 200 is changed with respect to the state in FIG. 3A. First, by driving the stage 178a, the lens 177 is moved by a distance S in a −y direction. In this state, in a case where the lens 179 is not moved, the image points A' and B' of the points A and B move in the −y direction within the nonlinear optical crystal for detection 132. Therefore, in order to correct this shift, by driving the stage 178b, the lens 179 is moved by a distance S' in a +y direction. By performing such control, it is possible to change (adjust) the incident angle $\theta$ of the far-infrared light incident on the points A' and B', with the positions of the points A' and B' in the same state as in FIG. 3A. The distances S and S' are not necessarily the same value and may not be the same value due to the relationship of a focal length.

The effect of this example will be described below. In the related art, changing the frequency of a light source for generating far-infrared light changes the direction in which the far-infrared light comes out, an irradiation position to a sample changes, and there is a problem that variations in component distribution and change in signal detection efficiency deteriorate the accuracy of quantitative analysis. On the other hand, according to this example, illumination light from a light source is emitted onto a target to be analyzed (sample 200) with an anamorphic imaging optical system, the wavelength of the transmitted light (or reflected light)

from the sample 200 is converted by using the nonlinear optical crystal for detection 132 and detected by using the photo-detector 290. According to this configuration, it is possible to reduce a shift of the irradiation position of far-infrared light due to frequency change. Therefore, variations in component distribution and change in signal detection efficiency do not occur, and the accuracy of quantitative analysis may be improved.

In addition, if the optical system is made complicated to reduce the shift of the irradiation position of the sample, the attenuation of the far-infrared light by the optical system is remarkable, and it is difficult to measure via the shield. On the other hand, in this example, the configuration for reducing the shift of the irradiation position of the sample is a simple configuration, the attenuation of the far-infrared light is also small, and thus the analysis through the shield is also possible. According to this example, it is possible to realize quantitative analysis of samples in various forms including powder irrespective of the presence or absence of a shield.

Second Example

FIG. 6 shows a configuration of the spectroscopy device in a second example. Constituent elements described in the above example are denoted by the same reference numerals, and description thereof will be omitted. The difference from the first example in FIG. 1 is mainly (i) the configuration of the illumination optical system 150 and the far-infrared light imaging optical system 170, and (ii) arrangement of the nonlinear optical crystal for detection 132, and (iii) that the pump light used for generating far-infrared light passing through the nonlinear optical crystal 130 is guided to the nonlinear optical crystal for detection 132 and reused.

The light source 110 of the pump light 115 includes, as a main component, a short-pulse Q switch YAG laser 111, a polarization splitting system consisting of a polarization beam splitter (hereinafter, referred to as PBS) 114 and a quarter wavelength plate 116, and an amplifier unit (here, solid-state amplifier 118 in this case) that amplifies the output of the laser. For example, the output beam of the YAG laser 111 is collimated by the lens 112 and is amplified by the solid-state amplifier 118 via the polarization separation system constituted by the PBS 114 and the quarter wavelength plate 116.

More specifically, the output beam of the YAG laser 111 is reflected by the mirror 181, collimated by the lens 112, reflected by the mirror 182, and incident on the PBS 114. The beam that passed through the PBS 114 is reflected by the mirror 183 via the quarter wavelength plate 116 and the solid-state amplifier 118. The reflected beam is incident on the PBS 114 via the solid-state amplifier 118 and the quarter wavelength plate 116. Thereafter, the beam is emitted as the pump light 115 from the PBS 114 via the mirror 184. By using the solid-state amplifier 118, the output of the YAG laser 111 is amplified, and powerful far-infrared light of kW level may be taken out from the nonlinear optical crystal 130 with peak power.

In this example, the illumination optical system 150 is constituted by a cylindrical lens 151 and a condensing lens 155. The far-infrared light emitted from the variable wavelength far-infrared light source 100 having a linear light-emitting region along the beam of the pump light 115 becomes parallel light flux by the cylindrical lens 151 and is condensed on the spot on the sample 200 by the condensing lens 155.

The far-infrared light transmitted through the sample 200 is guided to the nonlinear optical crystal for detection 132 by the far-infrared light imaging optical system 170. The far-infrared light imaging optical system 170 is an imaging optical system that images the sample 200 surface in the nonlinear optical crystal for detection 132. The far-infrared light imaging optical system 170 is constituted by a lens 176, a mirror 172, and a condensing lens 174. Specifically, the far-infrared light transmitted through the sample 200 is collimated by the lens 176, reflected by the mirror 172, and condensed on the nonlinear optical crystal for detection 132 by the condensing lens 174.

Figure 7A:
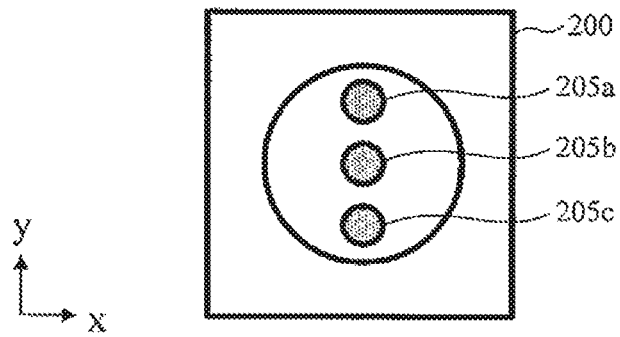
FIG. 7A is a view for explaining an irradiation position of the far-infrared light on a sample surface in the second example of the present invention.

FIG. 7A shows spots 205a, 205b, and 205c of far-infrared light on the sample 200 surface. As shown above, the far-infrared light emitted from the variable wavelength far-infrared light source 100 changes the emission direction thereof within the plane of FIG. 6 when wavelength scanning is performed (for example, θ1 to θ2 in FIG. 6). Therefore, for example, in a case where the wavelength of the seed light 125 is changed and the frequency of the far-infrared light to be generated changes from 1 THz to 3 THz, on the sample 200 surface, the spot of far-infrared light becomes a position of 205c at 1 THz on the low frequency side, a position of 205b at 2 THz at the intermediate frequency, a position of 205a at 3 THz on the high frequency side. In a case where the frequency is changed in this manner, the irradiation position on the sample 200 is different. Therefore, the position dependence of the concentration distribution affects the absorption spectrum, and an accurate spectrum may not be obtained. Therefore, in this example, the stage 202 of sample 200 is controlled in accordance with the frequency of far-infrared light so that the irradiation position does not change even if the frequency of far-infrared light changes.

When the wavelength of the seed light 125 is changed, the control unit 500 moves the stage 202 in accordance with the change in the irradiation position of the far-infrared light that may occur on the sample 200 surface. With this configuration, when the wavelength of the far-infrared light from the variable wavelength far-infrared light source 100 changes, far-infrared light may be emitted to the same position of the sample 200. That is, the irradiation position of far-infrared light on the sample 200 does not depend on the wavelength of far-infrared light from the variable wavelength far-infrared light source 100.

Figure 7B:
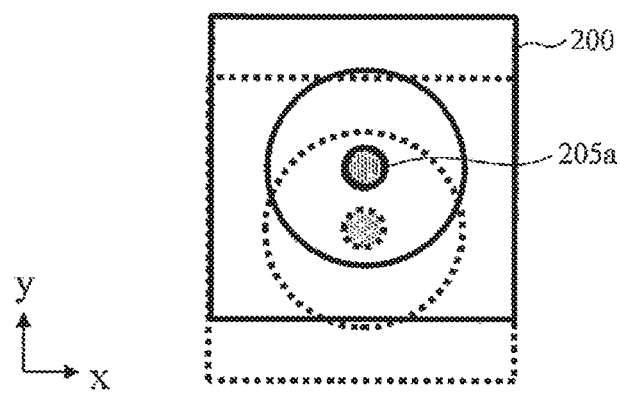
FIG. 7B is a view for explaining the irradiation position of the far-infrared light on the sample surface and the correction method thereof in the second example of the present invention.
Figure 7C:
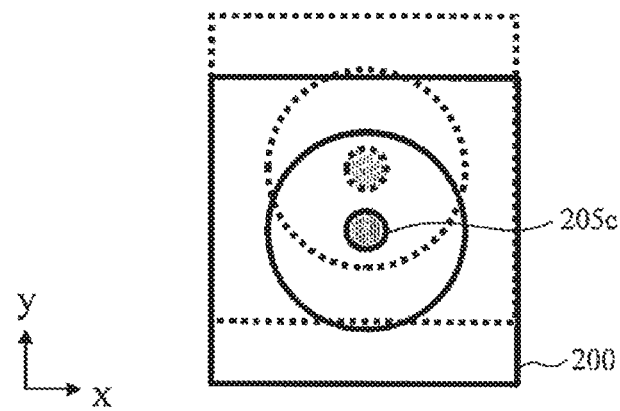
FIG. 7C is a view for explaining the irradiation position of the far-infrared light on the sample surface and the correction method thereof in the second example of the present invention.

For example, in a case where the wavelength of the far-infrared light from the variable wavelength far-infrared light source 100 is 1 THz on the low-frequency side, since the spot of the far-infrared light becomes a position of 205c, the control unit 500 drives the stage 202 in the −y direction (see FIG. 7C). In addition, in a case where the wavelength of the far-infrared light from the variable wavelength far-infrared light source 100 is 3 THz on the high-frequency side, since the spot of the far-infrared light becomes a position of 205a, the control unit 500 drives the stage 202 in the +y direction (see FIG. 7B). When the wavelength of the seed light 125 is changed, the control unit 500 is configured to move the stage 202 in accordance with the change in the irradiation position of the far-infrared light that may occur on the sample 200 surface so as to emit the spot of far-infrared light at the same position of the sample (the center in FIGS. 7A to 7C). According to this configuration, it is possible to avoid the influence of the position dependence of the concentration distribution on the absorption spectrum, thereby enabling accurate and stable spectrum measurement.

In addition, in this example, the pump light transmitted through the nonlinear optical crystal 130 is used as pump light for wavelength conversion. Specifically, the pump light transmitted through the nonlinear optical crystal 130 is reflected by the mirror 210 and guided to the nonlinear optical crystal for detection 132 as the pump light 235 for wavelength conversion. This configuration makes it possible to efficiently use the pump light 115 and is suitable when the power of the pump light 115 has no margin. However, for the purpose of reuse, the pump light 235 for wavelength conversion may be deformed in a time waveform. For that reason, conversion efficiency to near-infrared light and beam quality of converted near-infrared light may decrease. In a case where the power of the pump light 115 has a margin, it is desirable to branch the pump light into two for generating far-infrared light and converting to near-infrared light as shown in FIG. 1.

Figure 8:
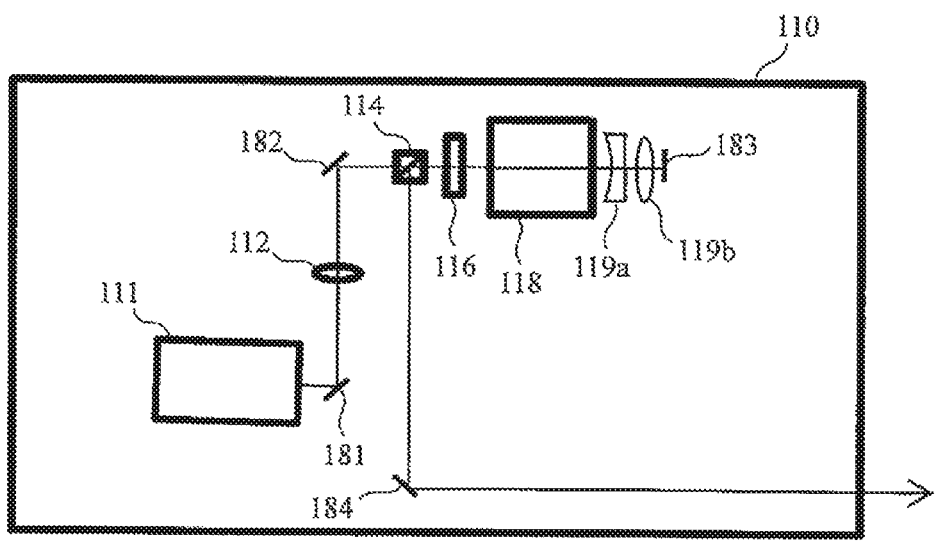
FIG. 8 is a view showing a configuration example of a light source for pump light of a variable wavelength far-infrared light source in the second example of the present invention.

FIG. 8 shows another configuration example of the light source 110 for the pump light 115 used in the variable wavelength far-infrared light source 100. The configuration of the light source 110 shown in FIG. 8 is also applicable to other examples. In FIG. 8, the same constituent elements as those in FIG. 6 are denoted by the same reference numerals.

The variable wavelength far-infrared light source 100 in this example includes lenses 119a and 119b for correcting a thermal lens effect occurring in the solid-state amplifier 118. That is, the difference from the example shown in FIG. 6 is that the two lenses 119a and 119b for correcting the thermal lens effect are arranged between the solid-state amplifier 118 and the mirror 183. In a case where the output of the YAG laser 111 is amplified by using the solid-state amplifier 118, the amplified beam may be squeezed by the thermal lens effect and damage the PBS 114 and the quarter wavelength plate 116 in some cases. Therefore, an optical system that corrects the thermal lens to be generated in the solid-state amplifier 118 is provided between the solid-state amplifier 118 and the folded mirror 183. Amplified light emitted from the solid-state amplifier 118 is incident on the lenses 119a and 119b for correction, and light transmitted through the lenses 119a and 119b is incident on the PBS 114 and the quarter wavelength plate 116.

Specifically, a combination of the concave lens 119a and the convex lens 119b is arranged between the solid-state amplifier 118 and the mirror 183 so that the composite focal length becomes negative. Further, the synthesized principal plane is configured to be located near the solid-state amplifier 118. According to this configuration, it is possible to return the convergent beam by the thermal lens to a parallel beam and hit the mirror 183, and thus it is possible to realize a configuration in which the beam reflected by the mirror 183 follows the opposite optical path, is incident on the solid-state amplifier 118 again, and is returned back to the parallel light flux by the thermal lens and emitted. Since the beam output from the solid-state amplifier 118 is parallel light flux, energy density on the polarization beam splitter 114 and the quarter wavelength plate 116 may be suppressed, and thus damage may be avoided.

Further, by configuring the optical system that corrects the thermal lens effect by the two lenses 119a and 119b, it is possible to adjust the focal length of the correction system. Even in a case where the thermal lens effect is changed by changing the gain of the solid-state amplifier 118, it is possible to deal with by adjusting the surface spacing of the lenses 119a and 119b and to constitute a system with a high degree of freedom. In addition, in this example, an optical system that corrects the thermal lens is provided between the solid-state amplifier 118 and the folding mirror 183, which may be expected to have an effect of avoiding damage to the optical system. At this position, the beam passes through the solid-state amplifier 118 only once and the beam power has not increased so much yet.

In the related art, since the frequency variable coherent light source requires a high output laser, the optical system is damaged by the thermal lens effect, and thus it is difficult to perform stable measurement. On the other hand, in the present example, the two lenses 119a and 119b are provided as an optical system that corrects the thermal lens effect, thereby avoiding damage to the optical system and enabling stable measurement. The configuration of the light source 110 for the pump light 115 shown in FIG. 8 may also be applied to other examples.

Third Example

Figure 9A:
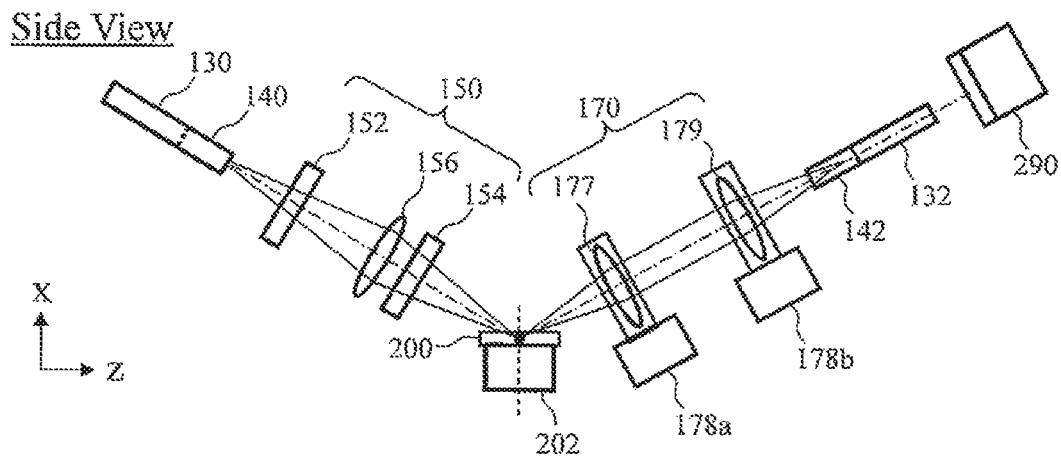
FIG. 9A is a side view of a configuration example of the spectroscopy device using light in the far-infrared region in a third example of the present invention.
Figure 9B:
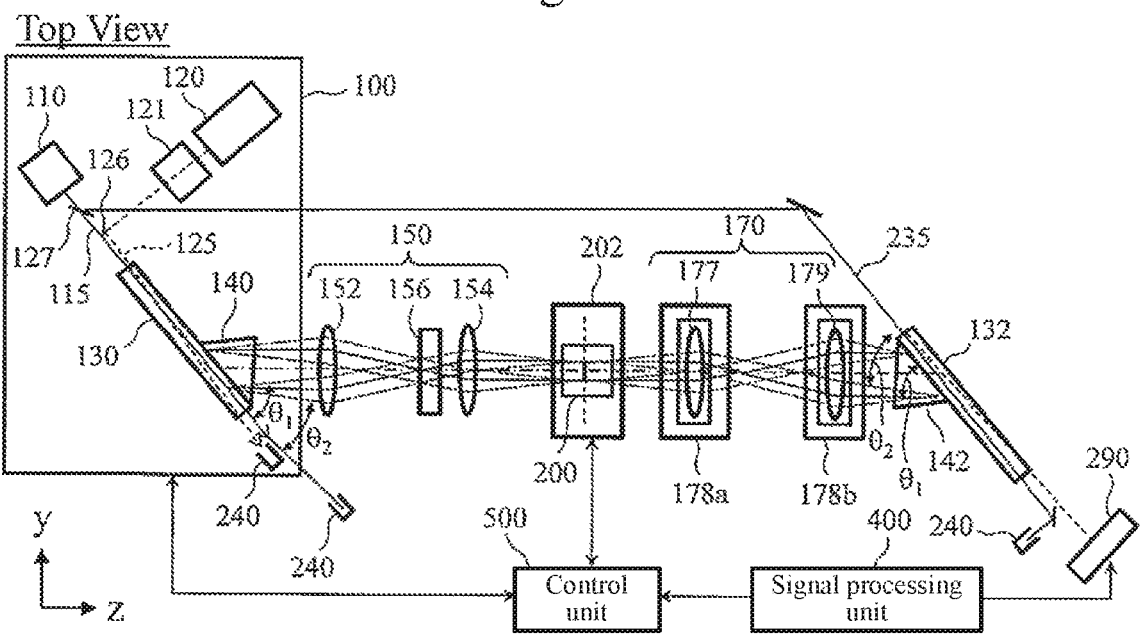
FIG. 9B is a top view of a configuration example of a spectroscopy device using light in the far-infrared region in the third example of the present invention.
Figure 9C:
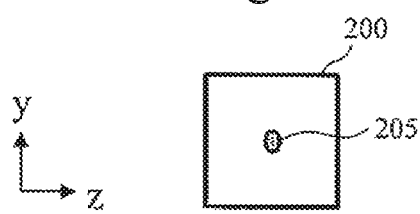
FIG. 9C is a plan view showing an irradiation region of a sample in the third example of the present invention.

FIGS. 9A and 9B show examples of the overall configuration of the far-infrared spectroscopy device according to a third example. FIG. 9C is a plan view showing an irradiation region of a sample in the third example. Constituent elements described in the above example are denoted by the same reference numerals, and description thereof will be omitted.

In the far-infrared spectroscopy device of this example, an absorption spectrum is measured by using the reflected light of the sample 200. With the sample 200 surface as the center, the constituent elements from the variable wavelength far-infrared light source 100 to the illumination optical system 150 and the constituent elements after the far-infrared light imaging optical system 170 are inclined with respect to the plane of the sample 200. In the far-infrared spectroscopy device of this example, far-infrared light is incident obliquely on the sample 200, and the reflected light from the sample 200 is detected.

According to this configuration, by arranging the illumination optical system 150 and the far-infrared light imaging optical system 170 inclined with respect to the surface of the sample 200, reflected light from the sample 200 may be detected. As a result, it is possible to measure the sample 200 having a low transmittance or to measure the spectral characteristics of the surface of the sample 200. A mechanism capable of changing the incident angle from the illumination optical system 150 and the angle to the far-infrared light imaging optical system 170 may be provided. As a result, it is also possible to measure incident angle dependence of the spectral characteristics.

Fourth Example

Figure 10A:
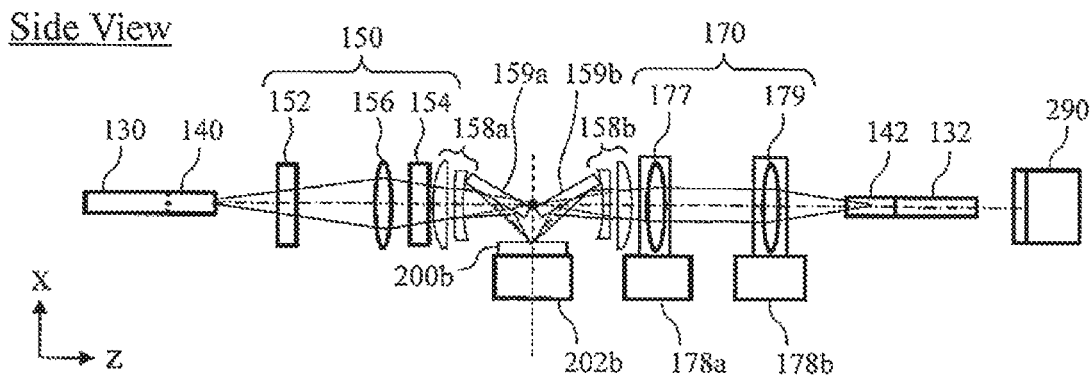
FIG. 10A is a side view of a configuration example of a spectroscopy device using light in a far-infrared region in a fourth example of the present invention.
Figure 10B:
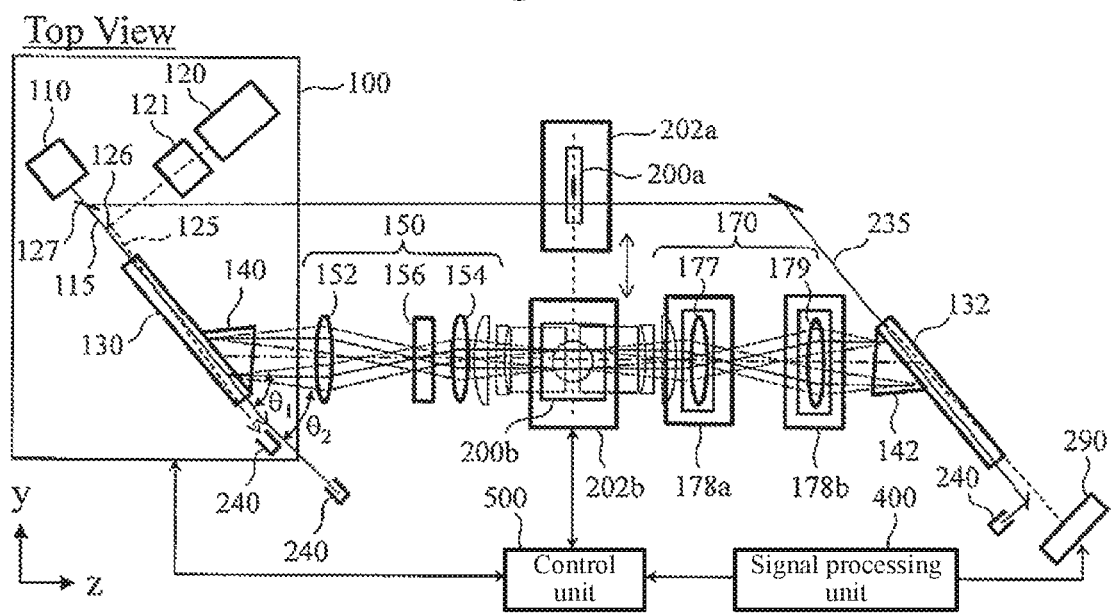
FIG. 10B is a top view of a configuration example of a spectroscopy device using light in the far-infrared region in the fourth example of the present invention.
Figure 10C:
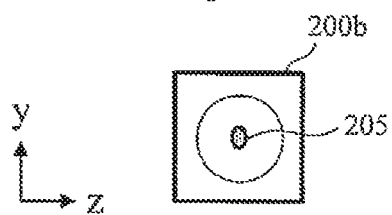
FIG. 10C is a plan view showing an irradiation region of a sample in the fourth example of the present invention.

FIGS. 10A and 10B show examples of the overall configuration of a far-infrared spectroscopy device according to a fourth example. FIG. 10C is a plan view showing an irradiation region of a sample in the fourth example. Constituent elements described in the above example are denoted by the same reference numerals, and description thereof will be omitted.

In the present example, each of the illumination optical system 150 and the far-infrared light imaging optical system 170 further includes an optical system that bends the optical path of far-infrared light and corrects the optical path length of far-infrared light. More specifically, between the illumination optical system 150 and a sample 200b, an optical system 158a that adjusts the optical path length and a mirror 159a are arranged. Further, a mirror 159b and an optical system 158b that adjusts the optical path length are arranged between the sample 200b and the far-infrared light imaging optical system 170. In addition, in this example, the sample 200b is arranged on an yz plane of a stage 202b. According to this configuration, the absorption spectrum measurement using the reflected light of the sample 200b becomes possible.

If the optical path of the far-infrared light is simply bent by the mirrors 159a and 159b and the reflected light of the sample is detected, the optical path length of the far-infrared light is elongated, and thus a focal point does not match on the sample surface. Hence, as a feature of the present example, the optical system 158a for correcting the optical path length is arranged in the front stage of the mirror 159a, and the optical system 158b for correcting the optical path length is arranged in the subsequent stage of the mirror 159b. Since the optical system is arranged symmetrically with respect to the sample 200b, the optical systems 158a and 158b may be the same. Since the optical systems 158a and 158b need to extend the optical path length, it is possible to constitute, for example, with one concave lens. According to this configuration, since additional parts are suppressed to the minimum, it is effective when the mounting constraint is severe.

On the other hand, the optical systems 158a and 158b may be constituted by a combination of a convex lens and a concave lens. According to this configuration, it is possible to adjust the focal length of the concave lens obtained by combining these lenses by adjusting the spacing between these lenses. Therefore, it is possible to use ready-made lenses. In addition, by adjusting the spacing between the lenses, the focal position may be adjusted.

The difference from the configuration of FIGS. 1A and 1B is only the addition of the mirrors 159a and 159b, and the optical systems 158a and 158b that adjust the optical path length, and holding of the sample 200b in the yz plane. Therefore, a mechanism for inserting and removing the mirrors 159a and 159b, and the optical systems 158a and 158b and a mechanism for replacing the sample 200b and the stage 202b with the sample 200a and the stage 202a may be provided (see FIG. 10B). By removing the mirrors 159a and 159b, and the optical systems 158a and 158b from the optical path of the far-infrared light and replacing the stage 202b with the stage 202a, it becomes possible to easily switch the measurement by the reflected light to the measurement by the transmitted light.

Fifth Example

Figure 11A:
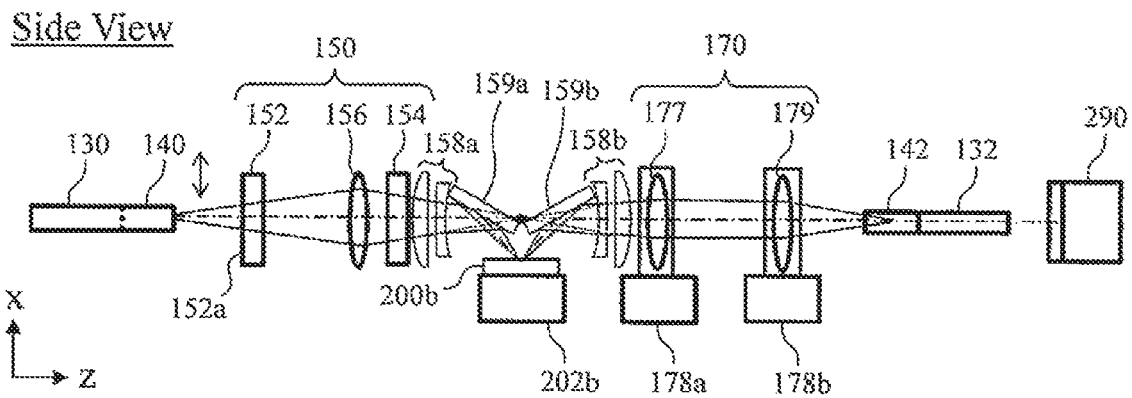
FIG. 11A is a side view of a configuration example of the spectroscopy device using light in the far-infrared region in a fifth example of the present invention.

FIG. 11A shows an example of the overall configuration of a far-infrared spectroscopy device according to a fifth example. Constituent elements described in the above example are denoted by the same reference numerals, and description thereof will be omitted.

Figure 12A:
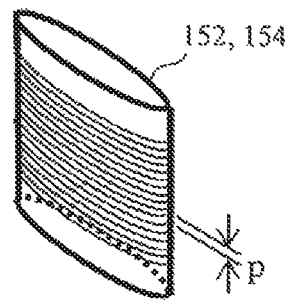
FIG. 12A is a view for explaining a groove structure of a surface of a cylindrical lens of an illumination optical system in the fifth example of the present invention.
Figure 12B:
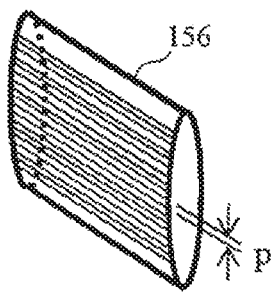
FIG. 12B is a view for explaining a groove structure of the surface of the cylindrical lens of the illumination optical system in the fifth example of the present invention.
Figure 12C:
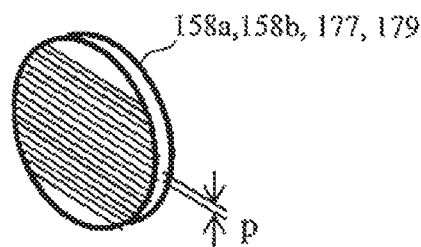
FIG. 12C is a view for explaining a groove structure of the surface of the lens used in an optical system for adjusting an optical path length and a far-infrared light imaging optical system in the fifth example of the present invention.
Figure 13:
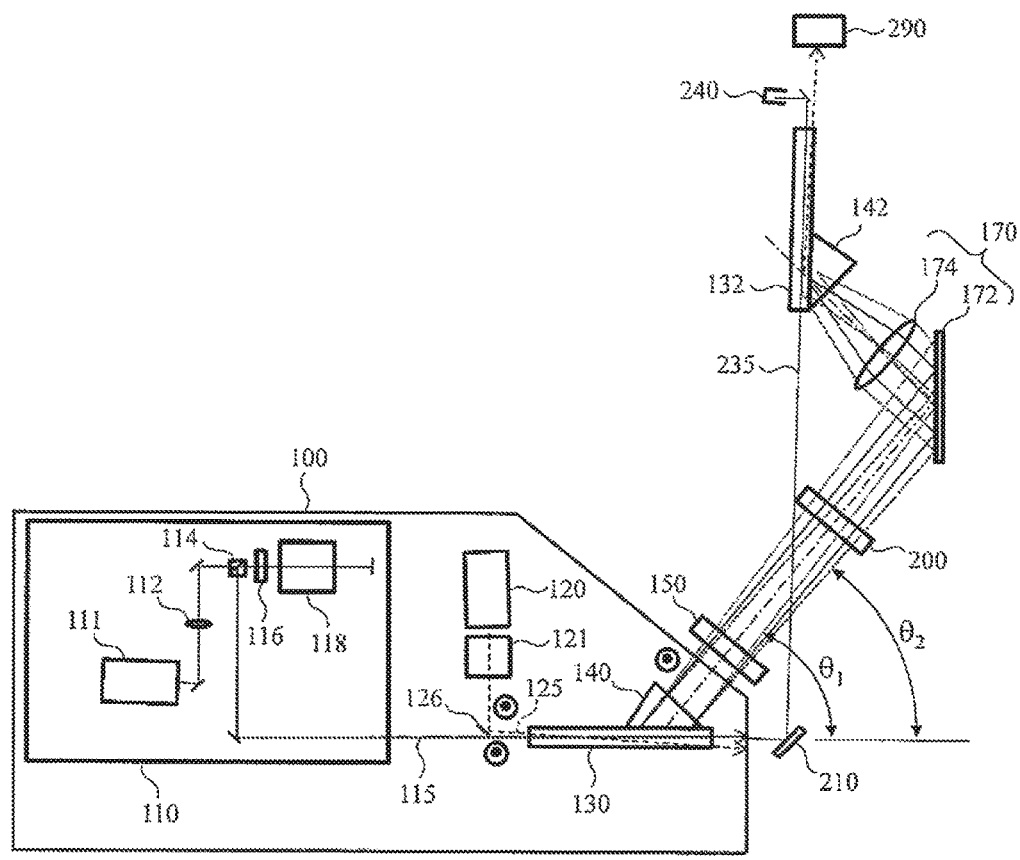
FIG. 13 is a view showing a configuration example of a far-infrared spectroscopy device using light in the far-infrared region in the related art.

The difference from the example described above is an optical element (for example, a lens) used in the illumination optical system 150 of the far-infrared light, an optical element (for example, a lens) used in the optical systems 158a and 158b for adjusting the optical path lengths, and that an optical element (for example, a lens) used in the far-infrared light imaging optical system 170 has a structure for preventing reflection as shown in FIGS. 12A to 12C. At least one optical element used in the illumination optical system 150 and the far-infrared light imaging optical system 170 includes groove-shaped processing to reduce reflection of far-infrared light.

Figure 11B:
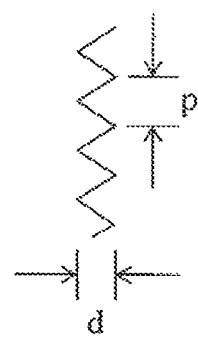
FIG. 11B is an enlarged view of a surface of a cylindrical lens of an illumination optical system in the fifth example of the present invention.
Figure 11C:
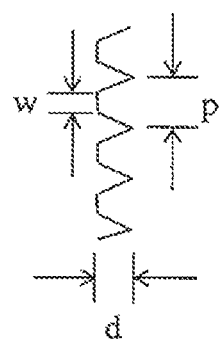
FIG. 11C is an enlarged view of a surface of a cylindrical lens of an illumination optical system in the fifth example of the present invention.

In FIG. 11A, the far-infrared light to be generated from the nonlinear optical crystal 130 for far infrared generation mainly consists of polarized components that vibrate in a vertical direction (x axis direction in the drawing) in the plane of the paper. In order to prevent reflection, the surface of the above-mentioned optical element is provided with a plurality of V-shaped grooves whose longitudinal direction is a direction (y-axis direction) orthogonal to the polarization direction. The plurality of grooves are formed substantially in parallel. FIGS. 11B and 11C are enlarged views of the surface 152a of the cylindrical lens 152 of the illumination optical system 150 as an example. The plurality of grooves have a depth d and are formed with a period p.

In the above configuration, it is known that if the period p of the groove is made sufficiently small with respect to the wavelength of far-infrared light, the period of the groove for incident far-infrared light is equivalent to a case in which the refractive index of an interface gradually changes. Therefore, as an example, it is preferable that the surface of the optical element described above has a groove having a period equal to or less than ⅓ of the wavelength of far-infrared light (that is, the spacing of the plurality of groove shapes is equal to or less than ⅓ of the wavelength of first far-infrared light from the variable wavelength far-infrared light source 100 or second far-infrared light from the sample 200). More preferably, the surface of the optical element described above is provided with a groove having a period equal to or less than ⅕ of the wavelength of far-infrared light. More preferably, the surface of the optical element described above has a groove having a period of about 1/10 of the wavelength of far-infrared light. For example, since far-infrared light of 1 to 3 THz has a wavelength of 100 to 300 um, it is advisable to form a groove having a period of about 10 um which is 1/10 of the wavelength. For the purpose of reflection reduction, it is desirable that the period of the groove is small, but if the period of the groove is less than about 10 um, which is 1/10 of the wavelength, it becomes difficult to ensure the processing accuracy, or the processing cost is high, and thus the practicality deteriorates. Therefore, it is desirable to set the period of the groove to about 1/10 of the wavelength. It is desirable that a depth d of the groove is about the same as a period p to about 10 times the period p. This is because, for the purpose of reflection reduction, it is desirable that the change in a refractive index on the optical element surface is gentle on the wavelength scale. That is, if the groove is shallow, the change in the refractive index is not alleviated and the effect of reducing surface reflection may not be obtained. On the other hand, if the depth exceeds 10 times the period p, processing becomes difficult and shape accuracy may not be maintained. When disturbance occurs in the groove shape, scattered light is generated and the reflection reducing effect is deteriorated.

Since the reflection on the surface of the optical element increases as the difference in the refractive index on the surface increases, it is possible to reduce the surface reflection by making a structure equivalent to a case in which the refractive index gradually changes. When forming a V-shaped groove, a portion keeping an original surface shape between adjacent grooves may be formed. As shown in FIG. 11C, between the plurality of groove shapes, a flat plane (w portion) is formed in a direction parallel to a plane orthogonal to the optical axis of the first far-infrared light from the variable wavelength far-infrared light source 100 or the second far-infrared light from the sample 200. The width of the flat plane is larger than the wavelength of the visible light. According to this configuration, the effect of reducing the surface reflection is weakened, but alignment of the optical system may be performed by using visible light, and thus adjustment of the optical system becomes easy. If the V-shaped grooves are made to be completely connected (w portion of FIG. 11C does not remain), since the beam of visible light for alignment is refracted by the groove structure, the visible light does not follow the same optical path as far-infrared light. However, if the width of the w portion is made larger than the wavelength of the visible light for alignment (for example, 1 um or more), the beam of visible light for alignment passing through the w portion follows the same optical path as the far-infrared light. Therefore, it is possible to perform alignment using a visible light beam while reducing surface reflection of far-infrared light.

FIG. 12A shows an example in which the groove structure described above is formed on the surfaces of the cylindrical lenses 152 and 154 of the illumination optical system 150. In addition, FIG. 12B shows an example in which the groove structure described above is formed on the surfaces of the cylindrical lenses 156 of the illumination optical system 150. FIG. 12C shows an example in which the groove structure described above is formed on the surfaces of the lenses 177 and 179 used for the optical systems 158a and 158b that adjust the optical path length, and the far-infrared light imaging optical system 170. In the example of FIG. 12A, grooves orthogonal to the generatrixes of the cylindrical lenses 152 and 154 are formed. In addition, in the example of FIG. 12B, a groove parallel to the generatrix of the cylindrical lens 156 is formed. In the example of FIG. 12C, the spherical lens includes a groove structure. These lenses for far-infrared light are often made of resin. Since resin lenses may be manufactured by molding using a mold, mass production may be carried out comparatively easily even if there is a groove structure on the surface like this.

The present invention is not limited to the above example, but includes various modifications. The above examples have been described in detail in order to describe the present invention in an easy-to-understand manner and are not necessarily limited to those having all the configurations described. In addition, it is also possible to replace part of the configuration of one example with the configuration of another example. In addition, it is also possible to add other example configurations to an example configuration. In addition, it is also possible to add, delete, or replace other configurations for part of the configuration of each example.

The processing of the signal processing unit 400 and the control unit 500 described above may also be realized by software program codes that realize these functions. In this case, a storage medium storing the program codes is provided to the system or device, and a computer (or CPU or MPU) of the system or device reads the program codes stored in the storage medium. In this case, the program codes themselves read from the storage medium realize the functions of the example described above, and thus the program codes themselves and the storage medium storing the program codes constitute the present invention. As the storage medium for supplying such program codes, for example, a flexible disk, a CD-ROM, a DVD-ROM, a hard disk, an optical disk, a magneto-optical disk, a CD-R, a magnetic tape, a nonvolatile memory card, a ROM, and the like are used.

The processes and techniques described herein are not inherently related to any particular device and may be implemented by any suitable combination of components. Further, various types of devices for a general purpose may be used. In some cases, it may be beneficial to construct a dedicated device to perform the processing described here. That is, a part of the signal processing unit 400 and the control unit 500 described above may be realized by hardware using an electronic component such as an integrated circuit, for example.

Further, in the above example, the control lines and the information lines indicate what is considered to be necessary for description, and all control lines and information lines are not necessarily shown on a product. All the configurations may be mutually connected.

REFERENCE SIGNS LIST 100 variable wavelength far-infrared light source
110 light source
111 Q switch YAG laser
112 lens
114 polarization beam splitter
115 pump light
116 quarter wavelength plate
118 solid-state amplifier (amplifier unit)
119a concave lens (thermal lens correction lens)
119b convex lens (thermal lens correction lens)
120 variable wavelength light source
121 incident angle adjusting optical system
122 lens
123 optical deflector
124 imaging optical element
125 seed light
126 mirror
130 nonlinear optical crystal
132 nonlinear optical crystal for detection
140, 142 Si prism
150 illumination optical system
170 far-infrared light imaging optical system
178a, 178b stage
200, 200a, 200b sample
202, 202a, 202b stage

The invention claimed is:

1. A far-infrared spectroscopy device comprising:
a variable wavelength far-infrared light source that generates first far-infrared light;
an illumination optical system that irradiates a sample with the first far-infrared light;
a nonlinear optical crystal for detection that converts second far-infrared light from the sample into near-infrared light by using pump light; and
a far-infrared light imaging optical system that images the sample on the nonlinear optical crystal for detection, wherein
the variable wavelength far-infrared light source includes two beams of laser light of different wavelengths and a nonlinear optical crystal for generation of far-infrared light,
the variable wavelength far-infrared light source generating far-infrared light by difference frequency generation or parametric generation, by irradiating the two beams of laser light onto the nonlinear optical crystal for generation of far-infrared light,
the illumination optical system is an anamorphic imaging optical system that forms an image of a linear far-infrared-light-emitting region of the variable wavelength far-infrared light source on the sample,
the illumination optical system is constructed by a first, a second and a third cylindrical lenses arranged in this order, and
the second cylindrical lens has its cylindrical axis parallel to a plane defined by the optical axis of the illumination optical system and the linear far-infrared-light-emitting region of the variable wavelength far-infrared light source, the first and the third cylindrical lenses have their cylindrical axes vertical to that of the second cylindrical lens and form an afocal imaging optical system, and an irradiation position of the first far-infrared light on the sample does not depend on a wavelength of the first far-infrared light.

2. The far-infrared spectroscopy device according to claim 1, wherein the illumination optical system images a linear far-infrared-light-emitting region formed by the variable wavelength far-infrared light source on a sample surface by reducing a longitudinal direction of the linear region.

3. The far-infrared spectroscopy device according to claim 1, wherein the variable wavelength far-infrared light source includes a solid-state amplifier that amplifies an output of a first laser and a correction lens that corrects a thermal lens effect of the solid-state amplifier, and the correction lens consists of a concave lens and a convex lens.

4. The far-infrared spectroscopy device according to claim 3, wherein the variable wavelength far-infrared light source further includes a polarization beam splitter, a wavelength plate, and a mirror and is configured such that amplified light transmitted through the solid-state amplifier once is incident on the correction lens, and the light transmitted through the correction lens is reflected by the mirror, transmitted through the correction lens again, and incident on the polarization beam splitter and the wavelength plate through the solid-state amplifier.

5. The far-infrared spectroscopy device according to claim 1, wherein the far-infrared light imaging optical system is an afocal imaging optical system consisting of two lenses and includes a mechanism for moving the lens on the sample side among the two lenses in at least one direction.

6. The far-infrared spectroscopy device according to claim 1, further comprising:

a sensor that detects near-infrared light converted by the nonlinear optical crystal for detection, wherein the sensor is an array sensor.

7. The far-infrared spectroscopy device according to claim 1, wherein the variable wavelength far-infrared light source includes an incident angle adjusting optical system consisting of an optical deflector and a single imaging optical element, one of the two beams of laser light is output light of a variable wavelength laser, the output light of the variable wavelength laser is configured to form a beam waist at a front focal plane of the single imaging optical element, and the incident angle adjusting optical system adjusts an incident angle of the output light of the variable wavelength laser to the nonlinear optical crystal for generating far-infrared light.

8. The far-infrared spectroscopy device according to claim 7, wherein the imaging optical element is a concave mirror.

9. The far-infrared spectroscopy device according to claim 1, wherein the first far-infrared light is emitted from a linear light-emitting region in the nonlinear optical crystal for generating far-infrared light, and the nonlinear optical crystal for generating far-infrared light and the nonlinear optical crystal for detection are located in a same plane and substantially parallel so that the second far-infrared light from the sample is converted to the near-infrared light efficiently in the nonlinear optical crystal for detection.

10. The far-infrared spectroscopy device according to claim 1, wherein the illumination optical system and the far-infrared light imaging optical system bend optical paths of the first and the second far-infrared light to obtain reflected light from the sample and include an optical system that corrects optical path lengths of the first and the second far-infrared light.

* * * * *